March 3, 1942.                H. B. PATCHE                2,274,932
                             ELECTRIC LANTERN
                           Filed July 24, 1940              3 Sheets-Sheet 2
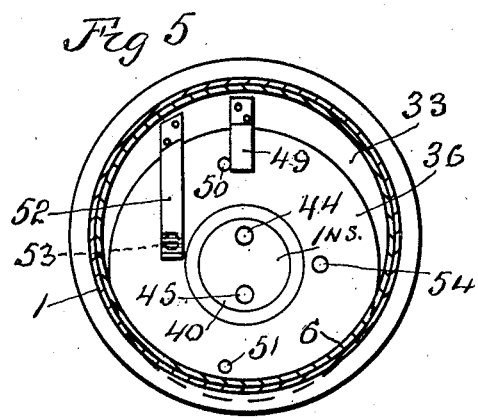
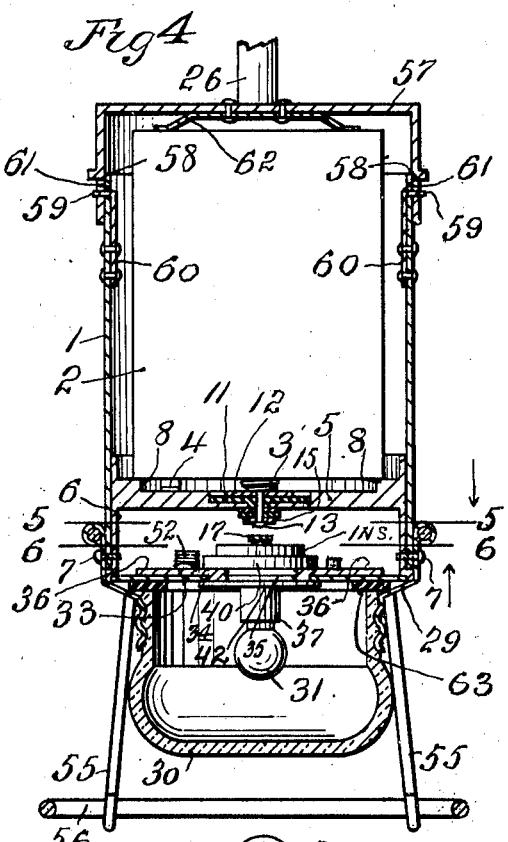
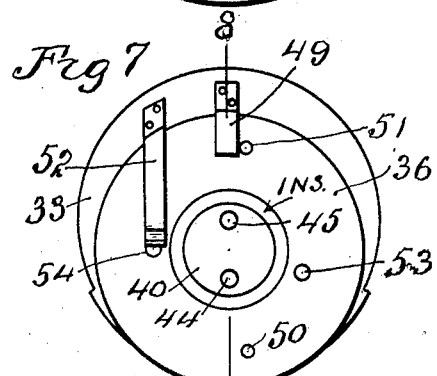
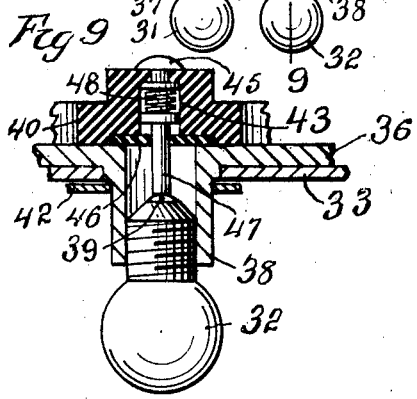
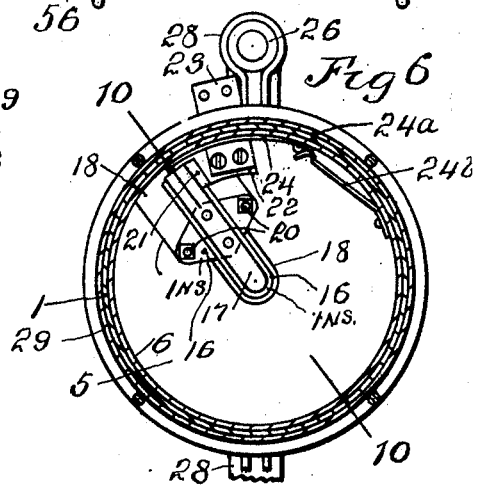
INVENTOR.
Henry B. Patche
BY Warren D. House
His ATTORNEY.

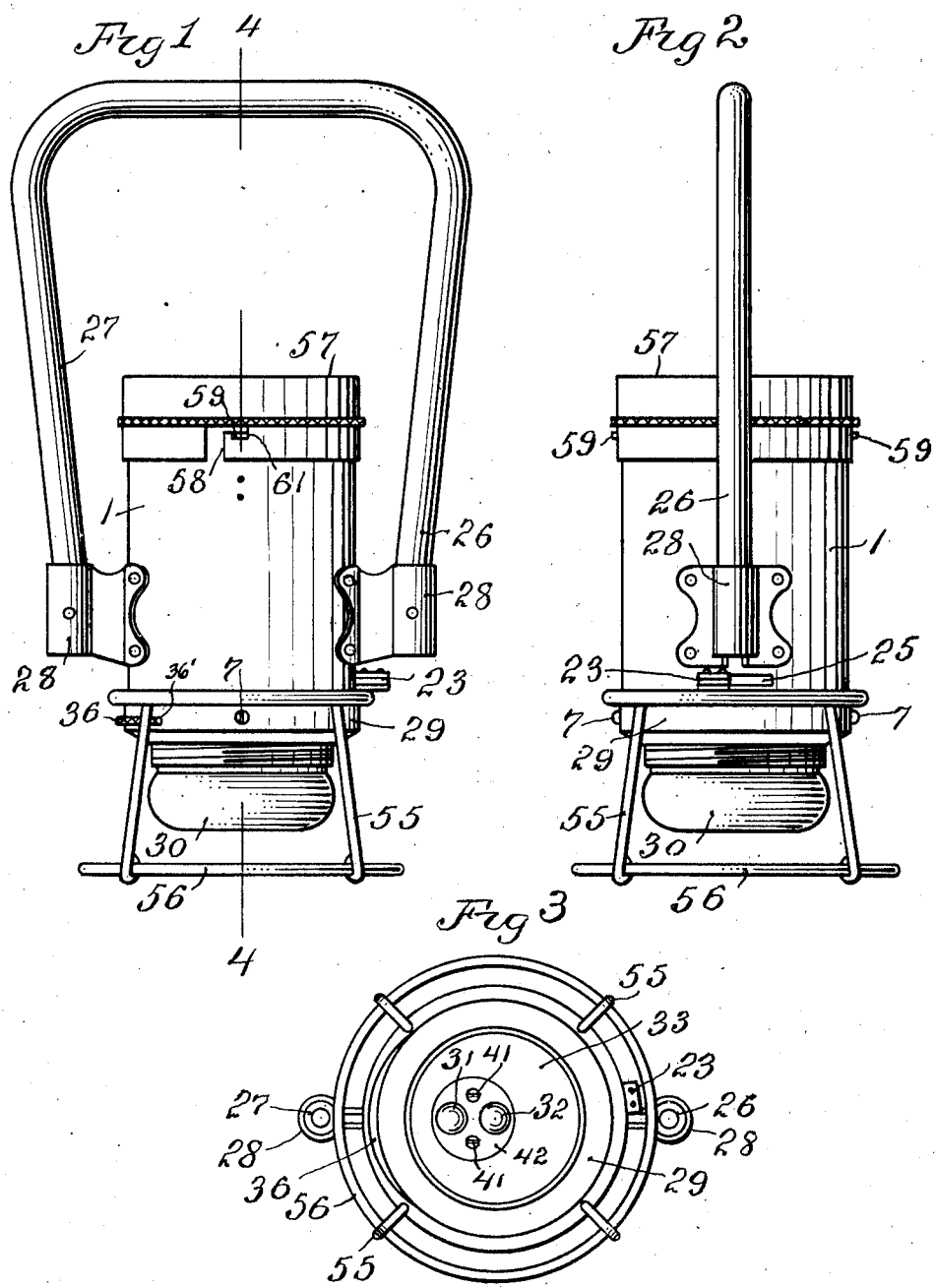

March 3, 1942.　　　H. B. PATCHE　　　2,274,932
ELECTRIC LANTERN
Filed July 24, 1940　　　3 Sheets-Sheet 3
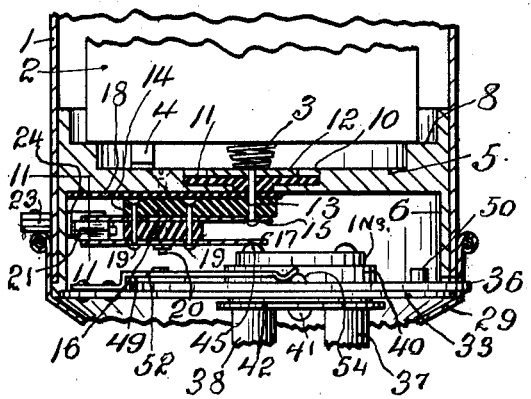
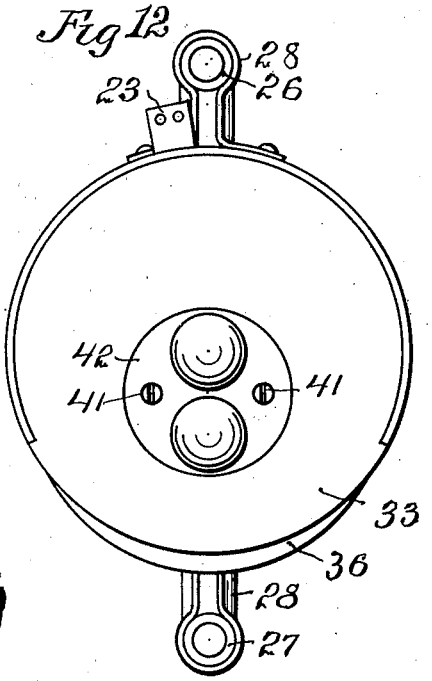
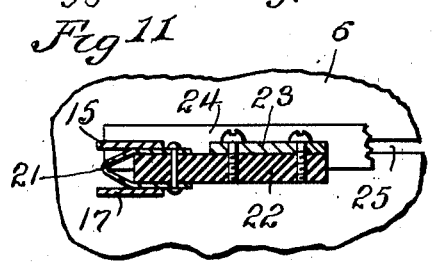
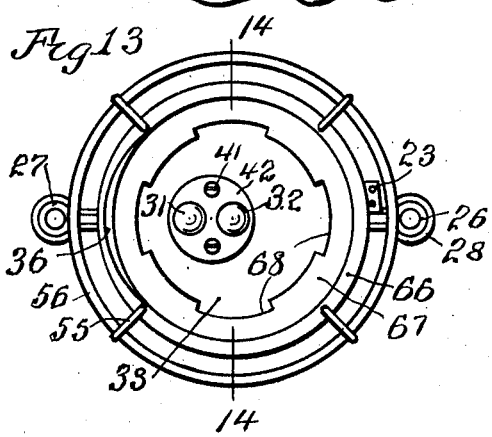
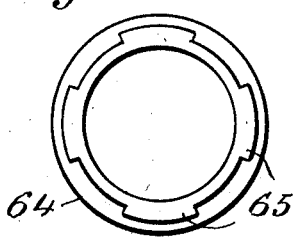
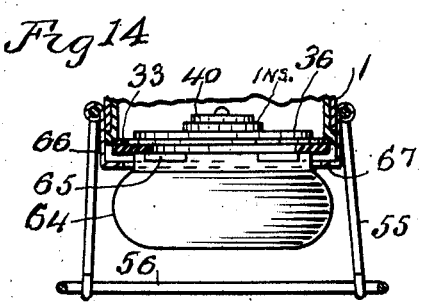
Henry B. Patche INVENTOR.
BY Warren D. House
His ATTORNEY.

Patented Mar. 3, 1942

2,274,932

UNITED STATES PATENT OFFICE 2,274,932

ELECTRIC LANTERN

Henry B. Patche, Kansas City, Mo., assignor to Genesy Electric Lantern Company, Rawlins, Wyo., a corporation of Wyoming Application July 24, 1940, Serial No. 347,176

2 Claims. (Cl. 240—10.63)

My invention relates to improvements in electric lanterns, of a type in which a casing is adapted to contain a battery cell and having means for supporting a plurality of incandescent lamp bulbs so that they may be selectively placed in circuit with the cell.

My invention is particularly well adapted for railroad usage.

One of the objects of my invention is the provision of novel means for supporting a battery cell in the casing in a way such that the usual spring positive and negative contacts will not be overstrained or broken, and which will avoid liability of the body of the cell being damaged.

A further object of my invention is the provision of novel means for supporting and adjusting the lamp bulbs to different positions.

Another object of my invention is the provision of novel means by which the operator can with the finger of one hand which grasps the handle of the lantern easily and quickly operate a novel switch mechanism for opening or closing the battery circuit.

Another object of my invention is the provision of novel means for releasably locking the cover of the casing in its closed position.

Another object of my invention is the provision of novel means for connecting the lamp bulbs to the battery circuit.

Still another object of my invention is the provision of a novel lantern of the kind described, which is relatively simple, strong, durable, not likely to get out of order, which is easy to handle and to operate, and which is efficient in its operation.

The novel features of my invention are hereinafter fully described and claimed.

In the accompanying drawings, which illustrate my invention,

Fig. 1 is one side elevation of my improved lantern of the type having the screw threaded lens fastening means.

Fig. 2 is another side elevation of what is shown in Fig. 1.

Fig. 3 is a bottom view of the lantern shown in Figs. 1 and 2, with the lens removed.

Fig. 4 is a side view, partly in section, on the plane of the line 4—4 of Fig. 1, some parts being shown in side elevation, and others broken away, and showing a battery cell in the casing.

Fig. 5 is a cross section looking downwardly on the line 5—5 of Fig. 4, the ring connecting the supporting legs being omitted.

Fig. 6 is a cross section looking upwardly on the line 6—6 of Fig. 4, parts being broken away.

Fig. 7 is a plan view of the bottom of the casing and the parts supporting the lamp bulbs, including the revoluble bulb support, its oscillation limiting means, and the contact devices, connecting the bulbs with the battery circuit, carried by the revoluble support, the latter being shown in a position diametrically opposite that in which it is shown in Fig. 5.

Fig. 8 is a fragmental section taken on the plane of the line 8—8 of Fig. 7, and showing a portion of the spring contact which engages the two bulb connecting contact devices.

Fig. 9 is an enlarged fragmental section on the line 9—9 of Fig. 8, the spring contact being omitted.

Fig. 10 is an enlarged section taken on the plane of the line 10—10 of Fig. 6.

Fig. 11 is an enlarged section on the line 11—11 of Fig. 10.

Fig. 12 is a view looking upwardly at the under side of the casing, parts below being omitted.

Fig. 13 is a bottom view of a form employing a different type of cup shaped lens, with the lens omitted.

Fig. 14 is a section on the plane of the line 14—14 of Fig. 13, with upper portions of the lantern broken away.

Fig. 15 is a top view of the lens shown in Fig. 14.

Fig. 16 is a side elevation of the lens shown in Figs. 14 and 15.

Similar characters of reference designate similar parts in the different views.

Referring to Figs. 1 to 12 inclusive, 1 designates a cylindrical tubular side wall of the body of a casing, having an open upper end adapted to receive a usual battery cell 2 of common type having at its lower end a central vertical coil spring 3, and a flat spring contact 4, constituting respectively the positive and negative contacts of the battery cell.

In the lower part of the casing is fastened to the inner side of the cylindrical side wall 1, a cell supporting member comprising a transverse horizontal portion 5, from the lower side of which downwardly extends a circular flange portion 6 fitted in the lower end of the wall 1 to which it is fastened by screws 7, see Figs. 4 and 10. An annular horizontal raised seat portion 8 is provided at the upper side of the portion 5 upon which is adapted to bear the peripheral edge portion of the lower end of the cell 2, thus providing a recess 9 in the upper side of the portion 5, in which are disposed the contact springs 3 and 4 of the cell.

The upper side of the portion 5 is provided centrally with a depression 10 in which is a plate of insulation 11 which supports a contact plate 12 upon which bears the coil contact spring 3. The member 5 is electrically conductive and upon it bears the flat battery spring 4. The portion 5 has through it a hole, and through this hole extends a central vertical insulated pin 13, Figs.

Under the member 5, Fig. 10, is attached thereto an insulation strip 18, to the under side of which is fastened insulation 14 to the under side of which is fastened a contact plate 15 engaged by the conductive pin 13 which extends through the insulation 18 and 14. At the under side of the contact plate 15 is insulation 16 to the under side of which is fastened by pins 19 a contact plate 17. The pins 19 are headed at both ends and extend through the insulations 14 and 16, and through enlarged holes in the contact plate 15.

Two bolts 20 extend through the member 5 and the insulation 16 and clamp the assembly described to the member 5, Figs. 6 and 10.

A V shaped contact 21 embraces one end of an insulation member 22, Fig. 11, fastened to a finger piece 23, which extends outwardly through a slot 25 that extends through the flange 6 and the wall 1, and has mounted on it a curved horizontal plate 24, which is at the inner side of the flange 6 and with the finger piece 23 closes the slot 25, Figs. 6, 10 and 11. The finger piece 23 is horizontally slidable in the slot 25 to and from a position, Fig. 11, in which the contact 21 will be between and conductively engaged with the contacts 15 and 17. To yielding hold the finger piece from accidental movement from the open or closed position, the inner side of the plate 24 has a rounded abutment 24a, Fig. 6, engageable at its opposite sides by the free curved end of a spring plate 24b, the other end of which is fastened to the inner side of the flange 6. In Fig. 6 the plate 24 and with it the finger piece 23 are shown held by the spring plate 24b in the closed position.

The finger piece 23 at its outer end is below and close to the lower end of one arm 26 of an inverted U shaped handle, the other arm 27 of which and the arm 26 extend upwardly and are fastened to opposite outer sides of the wall 1 by clips 28. One finger of the hand holding the arm 26 can engage and slide the finger piece 23 to and from the battery circuit closing position, shown in Figs. 6, 10 and 11.

Encircling the outer side and lower end of the wall 1 and fastened thereto by the screws 7 is a collar 29, the lower end of which is contracted and internally threaded for receiving and releasably holding the externally threaded upper end of a cup shaped lens 30, Figs. 1 and 4.

For removably supporting two usual incandescent lamp bulbs 31 and 32 in the lens 30, the following described mechanism is provided.

A circular bottom member comprising a flat metal plate 33 in the collar 29 is held by the latter against the lower edge of the flange 6 of the cell supporting member 5, Figs. 4 and 10. The bottom member 33 has through it a hole 34, Figs. 4, 8 and 9, in which is revoluble an annular boss 35 on the under side of a bulb supporting member comprising a flat horizontal circular plate 36 concentric with the axis of which is the boss 35. The hole 34 is disposed eccentric to the axis of the casing, which is the axis of the wall 1, Figs. 5, 7 and 10. A portion only of the periphery of the revoluble member 36 projects through a peripheral horizontal slot 36' in the wall of the casing 1, just above the bottom member 33 of the casing. Said projecting portion is knurled, as shown in Fig. 1, so that the revoluble member 36 may be turned by the hand of the operator to its two operative positions. As only the thin edge portion of the member 36 projects from the casing, liability of accidental turning of said revoluble member is minimized.

From the lower side of the boss 35 downwardly project two interiorly threaded sockets 37 and 38, adapted to have removably fitted in them the externally threaded stems having each in its upper end the central positive contact 39, Figs. 4, 8 and 9.

The sockets 37 and 38 are disposed at diametrically opposite sides of the axis of the supporting member 36, and at equal distances therefrom and having their orbit intersecting the casing axis, whereby by oscillating the member 36 to two opposite positions, each socket will be disposed with its axis in alinement with the casing axis, thereby supporting the bulb in the socket so located in the axial center of the lens 30, see Fig. 4.

As will be hereinafter described, the parts are so arranged that the lamp bulb, which is in the axis of the lens and the axis of the casing, will be in series with the battery, when the circuit is closed.

For selectively alternately connecting the lamp bulbs 31 and 32 in series with the switch contact 17, the following described mechanism is provided.

On the upper side of the member 36, over the sockets 37 and 38 is an insulation block 40 held clamped to the member 36 by two screws 41 which extend through a plate 42 at the under side of the bottom member 33, through the member 36 and into the insulation block 40, said plate 42 having two holes through which respectively extend the sockets 37 and 38, Figs. 3, 5, 8 and 10. The plate 42 by engaging the under side of the bottom member 33, holds the revoluble member 36 from accidental disengagement upwardly from the bottom member 33. The double seal, thus provided across the hole 34 in the bottom member 33, reduces the liability of water passing through the hole 34 into the casing.

The insulation block 40 has through it two vertical holes, 43, Figs. 8 and 9, which register with the sockets 37 and 38. In the upper ends of the holes 43 are respectively rigidly fastened two electric contacts 44 and 45, which alternately engage the switch contact 17, when the member 36 is oscillated to the two positions, shown in Figs. 5 and 7.

Extending respectively across the holes 43 at the under side of the insulation block 40 are two insulation plates 46 having central holes in which are respectively vertically slidable two conductive pins 47 each having a head at its upper end adapted to rest on the adjacent insulation plate 46. Two vertical coil springs 48 respectively bear at their upper ends against the lower ends of the contacts 44 and 45, and which bear at their lower ends against the heads of the pins 47. When the bulbs 31 and 32 are screwed into the sockets 37 and 38, the lower ends of the pins 47 will be engaged respectively by the contacts 39 of the lamp bulbs, and the pins 47 will be forced upwardly to compress the springs 48, which are conductive.

For limiting the oscillation of the bulb supporting member 36 to the two positions, shown in Figs. 5 and 7, a flat stop plate 49 is fastened to the upper side of the bottom member 33 and extends over the member 36 and is adapted to have its opposite side edges alternately engage two abutments comprising two pins 50 and 51 which extend upwardly from the member 36.

To releasably hold the member from accidental turning from the positions shown in Figs. 5 and 7, yielding means comprising a spring plate 52 is fastened at one end to the top of the bottom member 33 and has its free end bearing on top of the member 36. Its free end is curved upwardly. Another pair of abutments comprising two pins 53 and 54 extend upwardly from the member 36. With the member 36 in the position shown in Fig. 5, the pin 50 is against the left edge of the plate 49, and the pin 53 is under the free end of the spring plate 52, thus holding the member 36 from turning counter-clockwise. When the member 36 is turned counter-clockwise to the position, shown in Fig. 7, the pin 51 will engage the plate 49 and the pin 54 will be carried to the position shown in Fig. 7. In being so carried, the pin 54 will pass under the spring plate 52 and will be engaged by the free end of the latter, so as to hold the member 36 from accidentally turning clockwise from the operative position shown in Fig. 7.

By turning the member 36 clockwise, it may be returned to the position shown in Fig. 5.

For supporting the casing, legs 55 are attached at their upper ends to the collar 29, their lower ends being connected by a ring 56 disposed horizontally.

An inverted cup shaped cover 57 is removably slidable and revoluble on the upper end of the casing wall 1. It is provided on its under side with two diametrically opposite bayonet slots 58 adapted to respectively receive the outwardly extending portions 59 on the upper ends of two plates 60 secured to the inner side of the wall 1, the latter having two diametrically opposite slots 61 through which extend the portions 59, Figs. 1 and 4.

To the inner side of the cover 57 is attached a bow spring 62 adapted to bear against the upper end of the battery cell 2, and hold the cell tightly at its lower end to the seat portion 8 of the member 5, against the pressure of the battery springs 3 and 4.

The battery cell being thus tightly held, there is no liability of the setting or breaking of the springs 3 and 4 by a shock, such as might occur by dropping the lantern.

The current passes from the positive pole, the coil spring 3, of the battery 2, through the contact plate 12, the pin 13, the upper switch contact plate 15, the V shaped contact 21, the lower switch contact plate 17, the contact 45 (when the parts are in the positions shown in Figs. 5, 8 and 10), the adjacent coil spring 48, adjacent pin 47 lamp bulb 32 to ground, constituting the conductive member 36, bottom member 33 and member 5 to the contact 4 of the battery 2.

The operator, by pushing on the knurled projecting peripheral portion of the bulb supporting member 36, can selectively position either lamp bulb 31 or 32 in the operative position alined with the casing and lens axes.

With the finger of the hand holding the handle arm 26, the finger piece 23 can be slid to open or close the circuit, at will. The plate 24 and finger piece 23 close the slot 25 and prevent entrance of water.

Between the bottom member 33 and the upper edge of the lens 30 is clamped by them a gasket 63, Fig. 4.

The modified form, shown in Figs. 13 and 14 corresponds to that shown in Figs. 1 to 12, excepting that the modified form is provided with means for attaching thereto a cup shaped lens 64, the upper edge of which has lateral spaced apart projections 65, instead of a threaded upper edge, such as has the lens 30.

In the modified form, Figs. 13 and 14, in lieu of the collar 29, there is provided a collar 66, which at its upper end embraces and is fastened to the lower end portion of the casing 1, the lower edge portion 67 of the collar 66 being extended inwardly and provided with recesses 68 adapted to receive therethrough the projections 65 of the lens 64. When the projections are inserted through the recesses 68 and the lens turned, the projections will rest on the upper side of the portion 67. A resilient gasket 69 is disposed between the upper edge of the lens 64 and the under side of the portion 67 and held compressed, thus keeping the lens from accidental turning, and sealing tight the lower part of the casing bottom portion.

Other modifications of my invention may be made, within the scope of the appended claims, without departing from the spirit of my invention.

What I claim is:

1. In a lantern, a casing having in its side wall a horizontal slot and having below said slot a bottom member having a central vertical hole eccentric to the axis of said casing, a circular bulb supporting member revoluble on said bottom member to two positions and having on its under side a circular concentric boss revolubly fitted in said hole, said revoluble member having an edge portion only of its periphery projecting outwardly through said slot, said boss having extending downwardly from it two bulb receiving sockets with their axes in an orbit concentric with the axis of said revoluble member and intersecting the axis of said casing, and a plate fastened to the under side of said boss and projecting therefrom and engaging the under side of said bottom member, and having two holes through which respectively extend said two sockets.

2. In a lantern, a casing having in its side wall a horizontal slot and having below said slot a bottom member having a central vertical hole eccentric to the axis of said casing, a circular bulb supporting member revoluble on said bottom member to two positions and having on its under side a circular concentric boss revolubly fitted in said hole, said revoluble member having an edge portion only of its periphery projecting outwardly through said slot, said boss having extending downwardly from it two bulb receiving sockets with their axes in an orbit concentric with the axis of said revoluble member and intersecting the axis of said casing, a plate fastened to the under side of said boss and projecting therefrom and engaging the under side of said bottom member, and having two holes through which respectively extend said sockets, said revoluble member having two pairs of abutments, a stop member fastened to said bottom member in the path of one pair of said abutments and engaged at opposite sides alternately thereby when said revoluble member is turned to said two positions in which the axes of said sockets will alternately register with the axis of said casing, and resilient yielding means on said bottom member in the path of said other two abutments for releasably engaging said last named abutments for holding said revoluble member from accidental turning from said two positions.

HENRY B. PATCHE.